Aug. 20, 1968 W. C. BADGER ET AL 3,397,836
FLEXIBLE VANE AND VARIABLE VANE CASCADES
Filed Jan. 3, 1967 2 Sheets-Sheet 1

INVENTORS
William C. Badger, &
George W. Mason
Paul Fitzpatrick
ATTORNEY

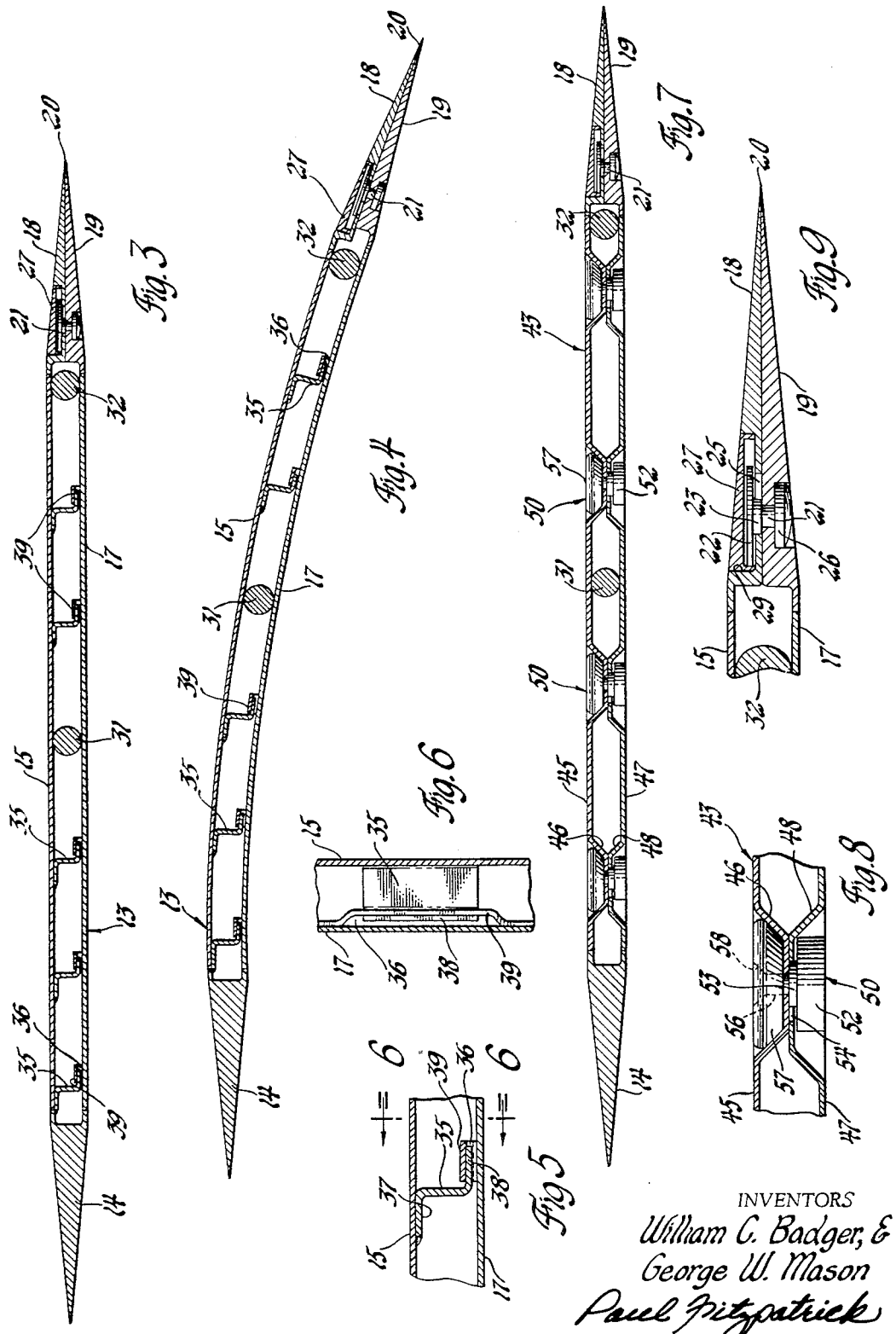

United States Patent Office 3,397,836
Patented Aug. 20, 1968

3,397,836
FLEXIBLE VANE AND VARIABLE
VANE CASCADES
William C. Badger and George W. Mason, Indianapolis, Ind., assignors to General Motors Corporation, Detroit, Mich., a corporation of Delaware
Filed Jan. 3, 1967, Ser. No. 606,713
15 Claims. (Cl. 230—114)

ABSTRACT OF THE DISCLOSURE

A variable camber vane cascade such as a compressor inlet guide vane ring. The vanes have a fixed strut at the leading edge and flexible skins defining the blade faces terminating in relatively slidable parts at the trailing edge. Slidable couplings are disposed between the faces. Actuating means to flex the blades engage the blades near the midchord and trailing edge.

---

Our invention has two principal aspects; first, a flexible variable camber airfoil which may have various structures; and second, a vane cascade as, for example, a compressor inlet vane guide ring or turbine nozzle structure, which embodies as vanes such airfoils and includes means for flexing the airfoils to vary the turning effect of the vane cascade.

Proposals to use variable camber vanes of one sort or another in fluid dynamic machinery are known. For example, the following patents contain structure which could be so described: Van Ormer, No. 1,544,288; Adamtchik, No. 2,337,861; Fanti, No. 3,042,371; LeBell et al., No. 3,237,918; British No. 893,054; and Australian No. 223,946. U.S. patent application Ser. No. 540,647 filed Apr. 6, 1966 of Chapman et al. for Variable Configuration Blade (of common ownership) discloses a blade in which the turning angle of the blade may be varied by projecting the leading and trailing edges. However, as will be seen from the succeeding description, our invention involves a blade structure quite different from these prior disclosures.

In its preferred form, our variable camber airfoil comprises a spar extending spanwise of the leading edge, two skins or walls extending from the spar and defining the faces of the blade, means coupling the skins so that they may slide relatively as the blade is flexed to vary its camber but acting to prevent local distortion or substantial changes in thickness of the airfoil, and a trailing edge structure involving relatively slidable edge portions on the two skins. Such airfoils may be employed in a cascade such as an inlet or nozzle vane ring with the spars preferably fixed, and with means to move the trailing edge of the blade circumferentially of the cascade to vary the leaving angle of the gas or other fluid.

The nature of the invention will be clear to those skilled in the art from the succeeding detailed description of preferred embodiments of the invention and the accompanying drawings thereof.

FIGURE 3 is a cross section of a vane taken on the plane indicated by the line 3—3 in FIGURE 1.

FIGURE 4 is a view of the same with the vane flexed.

FIGURE 5 is an enlargement of a portion of FIGURE 4.

FIGURE 6 is a fragmentary sectional view taken on the plane indicated by the line 6—6 in FIGURE 5.

FIGURE 7 is a view similar to FIGURE 3 of a second form of vane.

FIGURE 8 is an enlargement of a portion of FIGURE 7.

FIGURE 9 is an enlargement of the trailing edge portion of FIGURES 3 and 7.

Figure 1:
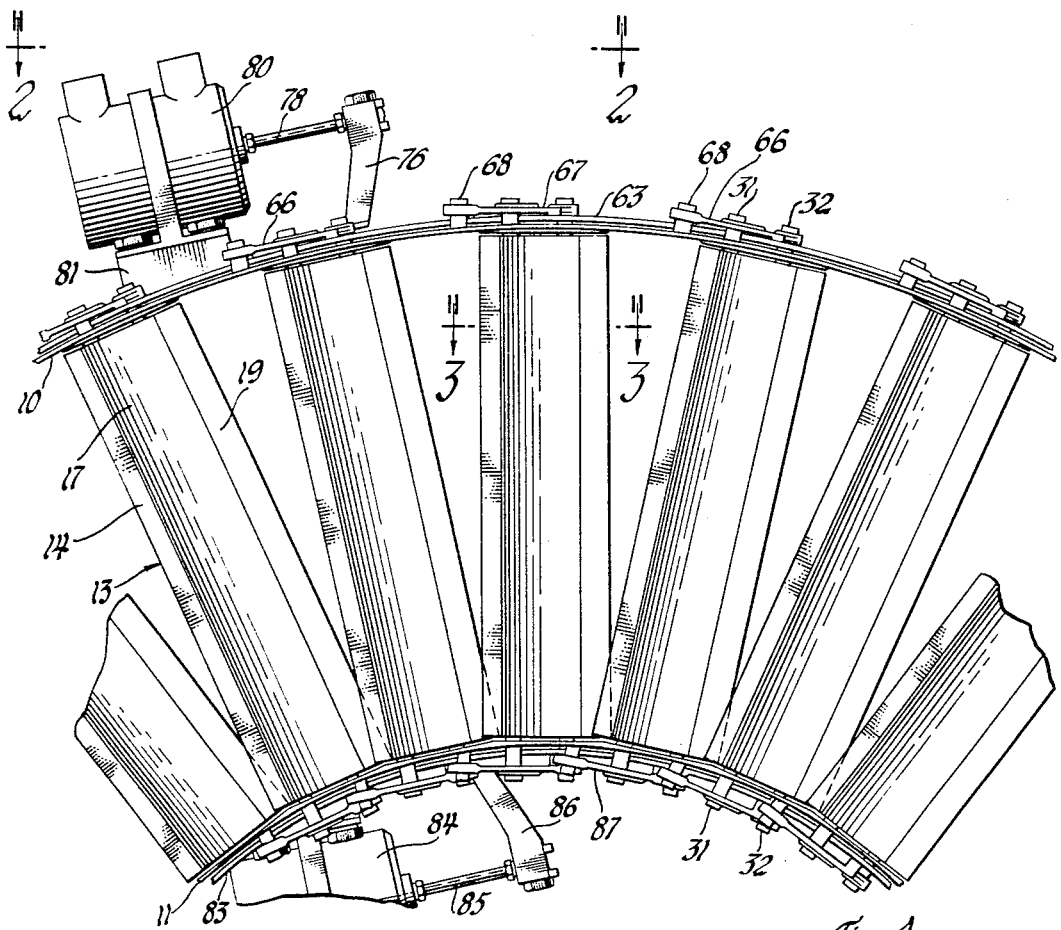
FIGURE 1 is an elevation view of a compressor inlet vane ring with parts cut away.
Figure 2:
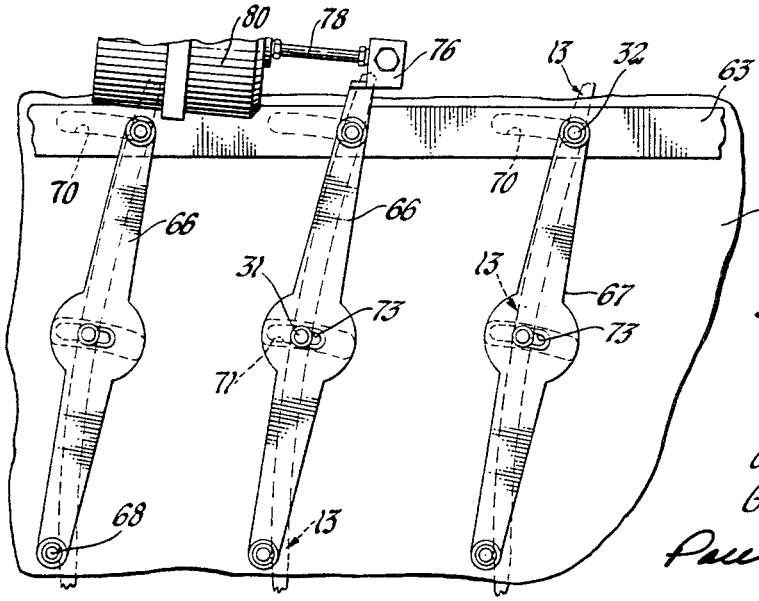
FIGURE 2 is a partial plan view of the same as viewed in the direction of the line 2—2 in FIGURE 1.

Referring first to FIGURES 1 and 2, the inlet of a compressor or the like is defined by an outer wall or shroud 10 and an inner wall or shroud 11 coaxial with the outer shroud. An annular cascade or ring of inlet guide vanes 13 extends from the outer to the inner shroud. These vanes impart the desired degree of swirl to the air entering the compressor as it flows to the first rotating blade stage (not illustrated). Referring also to FIGURES 3 and 4, each vane comprises a leading edge spar 14 suitably fixed to the shrouds 10 and 11. A first skin 15, which may be convex when the vane is cambered, and a second skin 17 which is concave when the vane is cambered, are brazed or welded to the spar 14. The trailing edges of the skins are brazed respectively to tapering plates 18 and 19 which together define the trailing edge portion 20 of the vane. Plates 18 and 19 may be considered to be parts of the skins 15 and 17. The plates 18 and 19 are connected together so as to be relatively slidable upon flexure of the vane by suitable means such as a stepped rivet 21 (FIGURE 9). This rivet has a two-step head including a disk 22 and a stem 23 which slides in a slot 25 in plate 18, the head 22 overlying the slot. The rivet is headed at 26 within a recess in the plate 19. A suitably shaped plug 27 pressed into the socket 29 in the plate 18 covers the head 22 and streamlines the plate. Depending upon the span of the vane, a suitable number of the slidable couplings may be provided between the plates 18 and 19 distributed along the span.

Two rods 31 and 32 extend through the span of the vane between and abutting skins 15 and 17, the former adjacent the midchord and the latter adjacent the trailing edge portion 20. These are shifted by any suitable means such as those to be described to change the camber of the vane and the angle through which it turns the fluid.

Means are provided to couple the two skins together so as to maintain them at a predetermined distance apart and prevent local bending or deformation, and to transfer, if necessary, any tension in the direction of the thickness of the vane from one skin to the other. Various slip connections may be employed for this connection but one which is simple and suitable, shown in FIGURES 3 to 6, embodies sets of tongue members 35 and sockets 36 distributed over the chord and span of the vane. The tongue 35 comprises a base 37 fixed to the skin 15 and a boss 38 disposed adjacent to the skin 17 which underlies a strap 39 fixed to skin 17. When the vane is flexed from its flat or zero camber contour of FIGURE 3 to the curved condition of FIGURE 4, the bosses 38 slide partially out of the sockets defined by straps 39 and plate 19 moves slightly rearwardly with respect to plate 18, thus accommodating the change of shape without disturbance of the smooth contour of the faces of the vane.

FIGURES 7 and 8 illustrate a second form of vane 43 which has a leading edge portion 14 and trailing edge plates 18 and 19 with the stepped connecting rivet 21 as in the previously described form. However, in the vane 43, skins 45 and 47 are formed with depressions 46 and 48 distributed over the length and width of the vane. The skins are in abutment at the bases of the depressions and are held in slidable contact by rivet assemblies 50. Each of these comprises a head 52, a reduced portion 53 slidable in a slot 54 in the skin 47, and a shank 56 which extends through a perforation in the depression 46. A frusto-conical washer 57 is fitted over the stem 56 which is then headed as indicated at 58 to secure the two skins together. It is obvious that many types of slip joints between the two skins and between the two trailing edge plates can be provided and the structures shown are merely illustrative.

FIGURES 1 and 2 show preferred means for shifting rods 31 and 32 circumferentially of the inlet to change the camber of vanes 13. An actuating ring 63 extending around the outer shroud 10 has spaced holes which receive the outer ends of rods 32. Corresponding to each rod 32 there is a lever 66 or 67, these levers being pivoted on bosses 68 extending from the outer shroud adjacent to the leading edges of vanes 13. The rods 32 extend through arcuate slots 70 in the shroud. The outer ends of rods 31 extend through arcuate slots 71 in the shroud and arcuate slots 73 in the levers 66 and 67. The levers 66 which may be spaced, for example, 60° apart around the inlet, are fitted with brackets 76 which includes a fitting which receives the piston rod 78 extending from a power cylinder 80. The cylinders 80 which are mounted on bosses 81 on the outer shroud, represent any suitable actuator which pushes and pulls on the lever 66 so that, when the actuators are simultaneously energized, the ring 63 is shifted clockwise or counterclockwise. Controls may be provided to move the ring 63 to any position within the range of movement of the vanes or the actuators may simply shift the vanes alternatively to the two end points of the range of travel determined by slots 70. Similar actuating means at the inside of the vane ring comprises an actuating ring 83, actuators 84 with rods 85, and levers 86 and 87, these being coupled to the radially inner ends of rods 31 and 32 which pass through slots in the inner shroud 11 so that the structure is essentially the same as that previously described. The actuators 84 would, ordinarily, be operated concurrently with the actuators 80.

As shown in FIGURE 2, the vanes are in their maximum camber condition. If the rods 78 and 85 are retracted, the mid chord portion of the vanes will move an amount corresponding to the clearance of the rods 31 in the slots 71 and the corresponding slots in the inner shroud, and the rods 32 adjacent the trailing edge will move an amount determined by the slots in the shrouds through which they pass. The vanes may be uncambered in this position or they may have any desired amount of camber. Obviously, with the structure shown, it is possible to vary the camber over the range and to reverse the curvature of the vane or airfoil, if desired.

It will be seen that a flexible variable camber airfoil and a simple actuating arrangement therefor is provided which is well adapted to meet the requirements of practice for various purposes including varying the swirl of air entering a compressor. The variable airfoil or cascade may be used as part of a rotating structure instead of a stationary one.

The detailed description of the preferred embodiment of the invention for the purpose of explaining the principles thereof is not to be considered as limiting or restricting the invention, as many modifications may be made by the exercise of skill in the art.

What is claimed is:
1. A variable camber airfoil comprising, in combination:
   a spar defining one edge of the airfoil,
   a first skin extending chordwise of the airfoil from the spar and defining one face of the airfoil,
   a second skin extending chordwise of the airfoil from the spar and defining the other face of the airfoil,
   coupling means intermediate the edges of the airfoil connecting the skins and determining the thickness dimension of the airfoil at the coupling means,
   the coupling means having structure providing for relative chordwise movement of the skins at the coupling means resulting from variation in camber of the airfoil,
   and means defining the other edge of the airfoil comprising two relatively slidable parts on the first and second skins, respectively.

2. An airfoil as recited in claim 1 in combination with means to flex the airfoil so as to vary its camber.
3. A combination as recited in claim 2 in which the said spar is fixed.
4. A combination as recited in claim 3 in which a flexing means engages the airfoil adjacent the said other edge.
5. A combination as recited in claim 4 including a second flexing means disposed between the spar and the aforesaid flexing means.
6. A combination as recited in claim 5 including common actuating means for the flexing means.
7. An airfoil as recited in claim 1 in combination with:
   a rod extending spanwise through the airfoil, and
   means connected to the ends of the rod operable to shift the rod in the thickness direction of the blade.
8. A combination as recited in claim 7 in which the rod is adjacent to the trailing edge of the airfoil.
9. A combination as recited in claim 7 in which the rod is adjacent to the midchord of the airfoil.
10. A combination as recited in claim 9 in combination with:
    a second rod extending spanwise through the airfoil adjacent to the trailing edge, and
    means coupling the second rod to the said shifting means.
11. An airfoil as recited in claim 1 in which the means defining the other edge of the airfoil includes two plates, one on each skin, and means holding the plates in contact with freedom for relative movement chordwise of the airfoil.
12. A variable vane ring comprising an outer shroud, an inner shroud, a ring of vanes extending between the shrouds, the vanes being of a flexible structure so that the camber of the vanes may be varied by flexing the vanes, in combination with camber varying means for the vanes comprising:
    means limiting movement of the portion of the vane adjacent one edge thereof around an axis extending spanwise of the vane,
    control means extending from the vane through the shrouds more remote from the said edge than the said limiting means,
    and means movable externally and circumferentially of the shrouds coupled to the control means operable to shift the control means circumferentially of the vane ring.
13. A vane ring as recited in claim 12 in which the means limiting movement comprises a rigid connection between the said one edge portion of the vane and at least one shroud.
14. A vane ring as recited in claim 13 in which the means limiting movement comprises also a limited motion connection between the vane and the shrouds adjacent the midchord of the vane.
15. A vane ring as recited in claim 12 including also a second control means spaced chordwise from the first control means and coupled to the said movable means.

References Cited

UNITED STATES PATENTS

| 1,544,288 | 6/1925 | Van Ormer | 253—78 |
| 2,337,861 | 12/1943 | Adamtchik | 230—114 |
| 2,699,598 | 1/1955 | Daugherty | 253—77 |
| 3,237,918 | 3/1966 | Bell et al. | 230—114 |

FOREIGN PATENTS

| 1,144,946 | 4/1957 | France. |
| 545,587 | 6/1942 | Great Britain. |
| 1,010,990 | 11/1965 | Great Britain. |

HENRY F. RADUAZO, *Primary Examiner.*